Patented Jan. 8, 1952

2,581,371

UNITED STATES PATENT OFFICE 2,581,371

HYDROXY ACETIC ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,775

19 Claims. (Cl. 260—53)

This invention relates to certain resins essentially of the phenol-aldehyde class, which have been modified so as to make them particularly valuable as chemical reactants, as hereinafter specified.

Briefly stated, said modified resins are obtained by reaction between (A) An alpha-beta alkylene oxide having not more than 4 carbon atoms and selected from the class consisting of ethylene oxide, propylene oxide, butylene oxide, glycide and methylglycide, and (B) An oxyalkylation-susceptible, fusible, organic solvent-soluble, water-insoluble, hydroxyacetic acid-esterified alkylene oxide-modified phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula

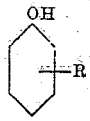

in which R is a hydrocarbon radical having at least 4 and not more than 12 carbon atoms and substituted in the 2,4,6 position; said resin being reacted with the aforementioned alkylene oxide, so as to convert at least a majority of the phenolic hydroxyls per resin molecule into aliphatic hydroxyl radicals, but in a molecular proportion, so that less than two moles of the alkylene oxide are used for each phenolic hydroxyl and said alkyleneoxide-modified phenolaldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals.

In our co-pending application Serial No. 59,774, filed November 12, 1948, we have described how such hydroxyacetic acid-modified phenol-aldehyde resins can be subjected to further oxyalkylation, so as to introduce hydrophile properties, and thus yield products valuable for many purposes where surface-active materials are employed. In another co-pending application, to wit, Serial No. 59,773, filed November 12, 1948, now Patent No. 2,541,990, issued February 20, 1951, we have described the use of said immediately aforementioned hydrophile products for breaking petroleum emulsions of the water-in-oil type.

It is hardly necessary to point out that the products prepared from the herein described resins have a number of reactive alkanol radicals, such as an ethanol radical, or a hydroxyacetic acid radical, or in some instances, may have some phenolic hydroxyls. Thus, they may be used as intermediates for the preparation of derivatives other than those previously mentioned. For example, the products may be reacted with chloroacetic acid and then with a tertiary amine to make cation-active products. They may be reacted with sulfo-benzoic acid or sulfo-succinic acid in the appropriate manner to yield anion-active products. They may be converted into ethers, or converted into a variey of esters or a large number of compounds obtainable from polyhydric alcohols including reaction with inorganic acids, etc.

In their simplest aspects the resins of the present invention may be exemplified by the following illustration. Ordinary phenol or meta-cresol reacts rapidly with an aldehyde to give a resin. This is true of other phenols, such as difunctional phenols. The reactivity of the ortho- or para-hydrogen atoms is directly related to the phenolic structure. When the phenolic structure is altered, as, for example, conversion into a hydroxyether, such as the following:

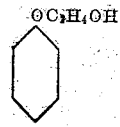

the reactivity of the para and hydrogen atoms is either eliminated, as far as an aldeyhde is concerned, or greatly reduced.

As far as we are aware, if such phenol is substituted even further, as, for example, the same derivative of difunctional phenol having the alkyl radical R in the para position, as illustrated by the following formula:

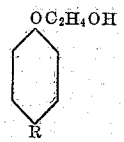

such compound is comparatively inactive towards aldehydes and if it forms resins at all, presumably under some conditions, which, as yet, have not been determined.

What has been said in regard to the previous compound applies with even greater force and effect if there were further modification, such as the formation of an ester, particularly an ester of a hydroxyacetic acid in which the hydroxyl is a primary alcoholic hydroxyl. Such compound may be illustrated by the following formula:

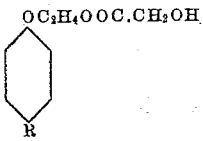

If it were possible to take a chemical compound of the above formula and resinify it by reaction with formaldehyde, for example, one would obtain a resin in which the structural unit can be depicted by the following formula:

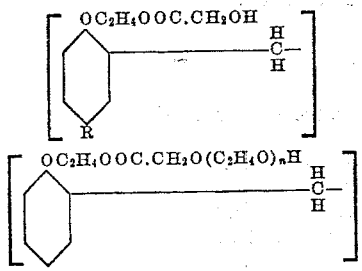

$n=1$ to 20, at least sufficient to give surface activity, as subsequently described.

Such oxyalkylated resin is the demulsifier, or, at least exemplifies one important aspect of the demulsifier employed in the instant invention.

Hypothetically, at least, one may consider the resin depicted by the previous formula as a phenolic resin such as contemplated as a raw material in our previously mentioned co-pending applications Serial Nos. 8,722 and 8,723, both filed February 16, 1948, now Patents 2,499,365 and 2,499,366, granted March 7, 1950, respectively. Actually, such resins are not obtainable from the ester, for reasons which have been indicated, and thus must be obtained indirectly, i. e., by first producing the resin from a di-functional phenol and an aldehyde, subjecting such resin to reaction with less than two moles of ethylene oxide or the like for each phenolic hydroxyl, then esterifying the alcoholic radicals or substantially all the alcoholic radicals, with hydroxyacetic acid, and then subjecting such intermediate to a further reaction with an alkylene oxide, particularly ethylene oxide, as hereinafter described. Such oxyalkylated product then becomes the demulsifier employed in the instant process.

The oxyalkylated resins, used to provide the alcoholic radical of the new esters, are described in our Patent 2,541,990, granted February 20, 1951, while the phenol-aldehyde resins, which are oxyalkylated to produce these alcoholic compounds are described in our Patent 2,499,370, granted March 7, 1950, and reference to these patents for a description of the phenol-aldehyde resins used and their oxyalkylation to produce the alcoholic products is made. For specific examples of the resins, reference is made to Examples 1a through 103a of Patent 2,499,370. For examples of the oxyalkylated products, reference is made to Examples 1b through 59b in columns 19 through 22 of Patent 2,541,990.

Having obtained the polyhydric alcohol, the esterification with hydroxyacetic acid or its equivalent is comparatively simple. Our preference is to use hydroxyacetic acid, and most advantageously from an economic standpoint the 85% commercial product. The remaining 15% in this commercial product is water. Such esterification product forms the acidic ester and water. Needless to say, one can employ any chemical equivalent, such as a low molal ester of hydroxyacetic acid. The methylester and ethyl ester may be employed, but for the most part, there is no advantage in doing so.

The ester formed may be the complete ester, or it may be a partial or fractional ester, provided that at least two or more moles of hydroxyacetic acid are used for each phenolic hydroxyl originally present. It is advantageous, however, to produce the complete ester by using sufficient hydroxyacetic acid, or the equivalent, to convert all the terminal alkanol radicals present into an ester radical. This applies particularly when ethylene oxide is used. In the event that glycide or methylglycide is used, the number of alkanol radicals or alcoholic hydroxyl radicals at least would be twice as great as the phenolic hydroxyls which have been subjected to alteration. All of this has been made clear, either by what has been said previously, or by the subsequent examples.

*Example 1c*

The polyhydroxy alcohol is the product described in Example 1b of Patent 2,541,990. Such product, prepared in the manner described, either shows no alkalinity, or at the most, a very slight alkalinity. If methyl or ethyl hydroxyacetate is employed to produce the ester, then and in that event, the catalyst employed is usually a few tenths of a percent, to ½% of an alkaline catalyst, such as soap, lead oleate, etc., in slightly basic material or the like. It has been pointed out previously that there are excellent reasons for preferring to use the commercial hydroxyacetic acid. If the xylene solution of the polyhydric alcohol reactant shows a slight alkalinity, it can be removed in any suitable manner by the addition of the inorganic acid, such as hydrochloric or phosphoric acid, or by the addition of an organic acid, such as acetic acid. The product should be acid to phenol phthalein indicator prior to the addition of hydroxyacetic acid. Of course, if it is still slightly basic, the only thing that will happen is that a more expensive acid, i. e., hydroxyacetic acid, will be wasted. In any event, one adds enough hydroxyacetic acid to convert all the ethanol radicals into ester radicals. In the specific example under description, the product represented 170 grams of the resin, 170 grams of xylene, 1.7 grams of sodium methylate and 44 grams of ethylene oxide, being a total of 385 grams. One mole of hydroxyacetic acid was added to this mixture, made neutral, as described by the addition of a very small amount of acetic acid for each phenolic nucleus originally present. As the resin employed was obtained from 1 mole of 150 grams of para-tertiarybutylphenol, one mole of hydroxyacetic acid (85%) or 90 grams, were added.

This mixture was then placed in a flask under the ordinary reflux condenser with a stirrer and the usual phase-separating trap. The mixture started to reflux at approximately 120°–130° C., and after refluxing action was well started, the trap valve was changed so that, instead of the entire condensate flowing back, only the xylene would be returned, and the water of solution and water of reaction were trapped and discarded. In approximately three to four hours the temperature reached a maximum of 170° to 180° C., and all the water was evolved. The water was discarded and the resultant product represented the complete ester of the polyhydric alcohol.

Example 2c

The same procedure was followed as in Example 1c, except that the resin employed was that described under the heading of Example 4b of Patent 2,541,990, which, in turn, was obtained from resin, Example 2a of Patent 2,499,370. The amount of hydroxyacetic acid employed was the same as in the preceding example. In this instance, and in all the remaining instances, the amount of reactants employed, as indicated by the total weight of resin and solvent and sodium methylate described in the table illustrating the polyhydric alcohol examples, i. e., the table including Examples 1b to 59b of Patent 2,541,990. In each case the amount of acid added was merely a matter of a gram or two at the most and can be ignored. However, even if more acid were added, it still would not affect the calculation, for the simple reason that in each instance where a mole of ethylene oxide is used, there must also be used a mole of hydroxyacetic acid, if one is attempting to obtain the complete ester, as is true in the previous instance, the present example and the next several succeeding examples. If, however, the amount of ethylene oxide employed happened to be more than 1 mole of ethylene oxide for each phenolic hydroxyl, but in any event, less than two moles of ethylene oxide for each phenolic hydroxyl, then the amount of hydroxyacetic acid would have to be based on the phenolic hydroxyl and not on the amount of ethylene oxide added. This can be illustrated by reference to the previous example. One started with 1 mole of butylphenol and ultimately used 1 mole of ethylene oxide for each mole of butylphenol. If in that particular example one had employed 50% more ethylene oxide, for instance, 66 grams, to combine with the 162 grams of resin, then obviously, if one used an equal amount of hydroxyacetic acid on a molar basis, to wit, 135 grams instead of 90 grams, obviously, acetic acid would have been left over, or else one would have to from an ester form dimer of hydroxyacetic acid. It is believed this explanation is all that is required if one prefers to form the ester from a polyhydric alcohol of the kind described in which more ethylene oxide is used and a mole-for-mole basis in terms of the phenolic hydroxyl.

Example 3c

The same procedure was employed as in the two preceding examples, except that the polyhydric alcohol employed was the one described under the heading of Example 5b of Patent 2,541,990, which, in turn, was obtained from resin, Example 3a of Patent 2,499,370. In this instance, the amount of resin used initially was greater, to wit, 176 grams, and likewise, the amount of solvent employed, to wit, 176 grams, but since the polyhydric alcohol reaction was obtained by the same amount of ethylene oxide, to wit, one gram mole (44 grams), the same amount of hydroxyacetic acid was added as in previous examples, to wit, 90 grams of the 85% material. The ester was produced in the same way.

Example 4c

The same procedure was followed as in the three preceding examples, except that the polyhydric alcohol reactant employed was that of Example 6b of Patent 2,541,990, which, in turn, was obtained from resin, Example 8a of Patent 2,499,370. Note the increased resin weight, i. e., 218 grams.

Example 5c

The same procedure was followed as in the four preceding examples, except that the polyhydric alcohol reactant employed was that of Example 7b of Patent 2,541,990, which, in turn, was obtained from resin, Example 9a of Patent 2,499,370. The procedure, in all respects, was the same as previously used, to wit, employing 90 grams of the 85% acetic acid.

Example 6c

The procedure was the same as in the previous examples, except that the polyhydric alcohol reactant employed was the one described under the heading of Example 45b of Patent 2,541,990, which, in turn, was obtained from resin, Example 69a of Patent 2,499,370. Note the weight of the resin was 244 grams.

Example 7c

The procedure was the same as in the previous examples, except that the polyhydric alcohol reactant employed was the one described under Example 51b of Patent 2,541,990, which, in turn, was obtained from resin, Example 70a of Patent 2,499,370. Note the weight of the resin was 232 grams. The amount of hydroxyacetic acid employed was the same as previously.

Example 8c

The polyhydric alcohol reactant employed was the one described under the heading of Example 50b of Patent 2,541,990, which, in turn, was obtained from resin, Example 71a of Patent 2,499,370. Note that the weight of the resin was 224 grams. The amount of hydroxyacetic acid employed was the same as before.

Example 9c

The polyhydric alcohol reactant employed was the one described under the heading of Example 59b of Patent 2,541,990, which, in turn, was obtained from resin, Example 72a of Patent 2,499,370. Note the weight of the resin was 246 grams.

Example 10c

The same procedure was employed as in the preceding nine examples, except that the amount of hydroxyacetic acid employed was approximately three-fourths the amount described in the preceding examples, to wit, 67.5 grams. This meant that on the average three of the ethanol radicals out of the four were converted into hydroxyacetic acid radicals and the fourth was unchanged. This simply illustrates the formation of a partial or fractional ester of a complete ester. Needless to say, the residual alkanol radical is reactive towards ethylene oxide. The esterification process is the same as in the preceding example, although the time required is a little less insofar that water of reaction and water of solution are somewhat smaller in amount.

Referring to the table illustrating Examples 1b to 59b of Patent 2,541,990, it will be noted that one mole of ethylene oxide was used in each instance for each phenolic hydroxyl. If a smaller amount had been used, for instance, 33 moles of ethylene oxide instead of 44, and assuming that the average resin molecule had 4 to 5 units, it is obvious that there would have been one residual phenolic hydroxyl which would have been unconverted, assuming statistical distribution. If such resin were treated with ethylene oxide, one could, of course, use mole for mole and not exceed the previously stated upper limit, but if one used a lesser amount, for instance, mole-for-mole on the basis of the alkylene oxide (ethylene oxide employed) then the use of 67.5 grams of 85% hydroxyacetic acid would have been just sufficient to combine with all the ethanol radicals and the remaining hydroxy radical would have been a phenolic hydroxyl radical and not an ethanol radical. Such phenolic hydroxyl radical, of course, would be just as susceptible to oxyalkylation in the succeeding step and would not interfere in any manner whatsoever.

What has been said in the previous parts is simply a description whereby one can produce a fusible, water-insoluble, organic solvent-soluble resin, substantially devoid of significant hydrophile properties, at least not sufficiently hydrophile to meet the requirements of the final oxyalkylated derivative, as described in the next succeeding part. For purpose of convenience, it may be well to re-summarize the nature of this resinous material, which is subsequently subjected to oxyalkylation, as described in the instant section.

Difunctional phenols and aldehydes produce resins of the kind which may be represented in idealized form by the following formula, as previously stated, and in which the characters have their prior significance:

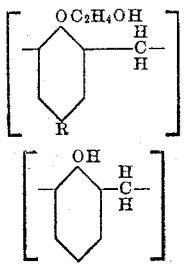

In the present instance one is concerned with the oxyalkylation, particularly the oxyethylation, of a resin, which, in one of its more important aspects, may be characterized by the previous formula, which is as follows:

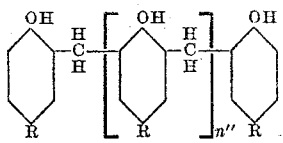

However, although the resin molecule subsequently subjected to oxyethylation is admirably illustrated by the aforementioned idealized structure, yet it has been pointed out that there may be present in the resin molecule either one of two structures which do not necessarily convert the hydroxyacetic acid radical. Such structures are the following two:

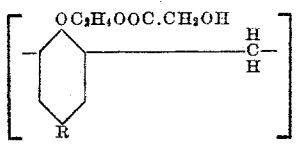

However, it has been pointed out also that the amount of ethylene oxide, or other alkylene oxide employed, may be more than mole-for-mole, based on the original phenolic hydroxyl, but must be less than two moles for one, and regardless of the amount of alkylene oxide employed, the final product, i. e., the ester (total or partial) must meet the requirements in regard to lack of hydrophile properties, as previously stated and hereinafter specified in greater detail in respect to the final oxyalkylated product. Thus, not only might the previous structures appear in the resin, but other structures, which may be illustrated by the following:

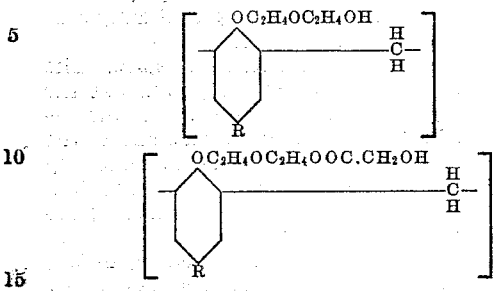

Needless to say, the complexity of the various structures increases when the alkylene oxide happens to be of the type exemplified by glycide or methylglycide. However, for purpose of brevity, further elaboration is being avoided and it is believed it is unnecessary, in light of the very comprehensive description preceding, and which appears hereafter.

Referring now to hydroxyacetic acid ester resins which are subjected to oxyalkylation, particularly oxyethylation, to give synthetic compounds having at least minimum hydrophile properties, as hereinafter described, it is to be noted that the procedure is substantially the same as in the oxyalkylation, particularly oxyethylation, of resins obtained exclusively from difunctional phenols and aldehydes, as described in our aforementioned co-pending applications Serial Nos. 8,730 and 8,731, both filed February 16, 1948, now abandoned. The original resins, as prepared in the examples indicated by Example 1a, etc. of Patent 2,499,370, vary, as previously stated, from hard resins to viscous fluids. They vary in color from almost water-white to pale amber, amber, deep amber, or a reddish-black. The initial step of oxyalkylation reduces the state of the resin to a less viscous state, i. e., from a hard melting solid to a tacky solid, from a tacky solid to a viscous liquid, from a viscous liquid to a thinner liquid, etc. A comparatively small amount of alkylene oxide added in the conversion into the polyhydric alcohol state does not materially affect color. Similarly, esterification with hydroxyacetic acid seems to have substantially the same effect as far as physical appearance goes, to wit, in the direction of greater fluidity; in any event, in the direction going from a solvent to a liquid. There is not much change in color, although the tendency is to lighten the product. Thus, the esters subjected to the final oxyalkylation may vary from hard or sticky solids, or, in some instances, to highly viscous fluids, sometimes pitch-like in character, to fluids of viscosity resembling castor oil, or even less, and sometimes comparatively thin fluids. Needless to say, when diluted with xylene or any other selected solvent, they show no appreciable viscosity at all.

It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner, as is employed in the case of the non-hydrogenated resin. The second procedure is to hydrogenate the oxyalkylated derivative, rather than the resin itself. As an example of such procedure, reference is made to our co-pending application Serial No. 726,201, filed February 3, 1947, now abandoned.

As previously intimated, the products herein described, in addition to being of particular value for resolving petroleum emulsions of the water-in-oil type, also have various other uses, such as wetting, detergent and leveling agents in the laundry, textile and dyeing industries; as wetting agents and detergents in the acid washing of building stone and brick; as wetting agents and spreaders in the application of asphalt in road building and the like; as a constituent of soldering flux preparations; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

Having thus described our invention, what we claim as new and desire to secure by Letters Patent is:

1. A modified phenol-aldehyde resin which is an oxyalkylation-susceptible, fusible, organic solvent-soluble, water-insoluble, hydroxyacetic acid-esterified alkylene oxide-modified phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

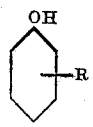

in which R is a hydrocarbon radical having at least 4 and not more than 12 carbon atoms and substituted in one of the positions ortho and para; said resin being reacted with an alpha, beta-alkylene oxide having not more than four carbon atoms and selected from the class consisting of ethylene oxide, propylene oxide, butylene oxide, glycide and methyl glycide so as to convert at least a majority of the phenolic hydroxyls per resin molecule into aliphatic hydroxyl radicals but in a molecular proportion so that less than two moles of the alkylene oxide are used for each phenolic hydroxyl; and said alkylene oxide-modified phenol-aldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals.

2. A modified phenol-aldehyde resin which is an oxyethylation-susceptible, fusible, organic solvent-soluble, water-insoluble, hydroxyacetic acid-esterified ethylene oxide-modified phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

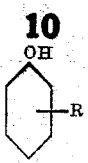

in which R is a hydrocarbon radical having at least 4 and no more than 12 carbon atoms and substituted in one of the positions ortho and para; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; and said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical.

3. A modified phenol-aldehyde resin which is an oxyethylation-susceptible, fusible, organic solvent-soluble, water-insoluble, hydroxyacetic acid-esterified ethylene oxide-modified, low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

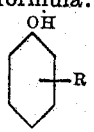

in which R is a hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; and said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical.

4. A modified phenol-aldehyde resin which is an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

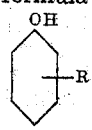

in which R is an aliphatic hydrocarbon radical having at least 4 and not more than 12 carbon atoms and substituted in one of the positions ortho and para; and resin being reacted with ethylene oxide so as to convert at least a majority of the phenolic hydroxyls per resin molecule into ethanol radicals, but in a molecular proportion, so that less than two moles of the ethylene oxide are used for each phenolic hydroxyl; and said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical.

5. A modified phenol-aldehyde resin which is an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and having one functional group reactive towards said phenol; said resin being formed in the substantial absence of phenols of functionally greater than two; said phenol being of the formula:

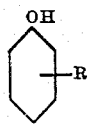

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals, but in a molecular proportion, so that less than two moles of the ethylene oxide are used for each phenolic hydroxyl; said ethylene-oxide modified phenol aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical.

6. A modified phenol-aldehyde resin which is an oxyethylation-susceptible, fusible, organic solvent-soluble, water-insoluble, hydroxyacetic acid-esterified ethylene oxide modified low-stage phenol-aldehyde resin; said initial phenol aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

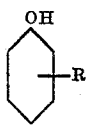

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical.

7. A modified phenol-aldehyde resin which is an oxyethylation-susceptible, fusible, organic solvent-soluble, water-insoluble, hydroxyacetic acid-esterified ethylene oxide-modified low-stage acid-catalyzed phenol-aldehyde resin; said initial phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

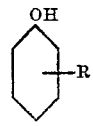

in which R is an aliphatic hydrocarbon radical having at least 4 and not more than 12 carbon atoms and substituted in one of the positions ortho and para; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical.

8. The resin of claim 5, wherein R is substituted in the para position.

9. The resin of claim 5, wherein R is a butyl radical substituted in the para position.

10. The resin of claim 5, wherein R is an amyl radical substituted in the para position.

11. The resin of claim 5, wherein R is an octyl radical substituted in the para position.

12. The resin of claim 6, wherein R is substituted in the para position.

13. The resin of claim 6, wherein R is a butyl radical substituted in the para position.

14. The resin of claim 6, wherein R is an amyl radical substituted in the para position.

15. The resin of claim 6, wherein R is an octyl radical substituted in the para position.

16. The resin of claim 7, wherein R is substituted in the para position.

17. The resin of claim 7, wherein R is a butyl radical substituted in the para position.

18. The resin of claim 7, wherein R is an amyl radical substituted in the para position.

19. The resin of claim 7, wherein R is an octyl radical substituted in the para position.

MELVIN DE GROOTE.
BERNHARD KEISER.

No references cited.